United States Patent [19]
Durant et al.

[11] Patent Number: 5,976,224
[45] Date of Patent: Nov. 2, 1999

[54] SEPARATING CARBON FROM ASH

[76] Inventors: James F. Durant, 50 Prospect St., Bloomfield, Conn. 06002; Glen D. Jukkola, 55 Shagbark Rd., Glastonbury, Conn. 06033; Michael S. McCartney, 15 Bear Ridge Dr., Bloomfield, Conn. 06002; Nicole M. Phyfe, 411 Stagecoach Row, Colchester; Reed S. C. Rogers, 4 Coachmans Run, Avon, both of Conn. 06001; Gregory R. Strich, 31 S. Meadow La., Enfield, Conn. 06082

[21] Appl. No.: 09/072,479

[22] Filed: May 4, 1998

[51] Int. Cl.⁶ .............................. B01D 50/00; B07B 4/00
[52] U.S. Cl. ................... 95/268; 95/270; 55/319; 55/331; 55/408; 55/DIG. 30; 209/139.1; 209/141; 209/714; 110/165 A; 110/216
[58] Field of Search ................. 95/268, 270; 55/318, 55/319, 320, 331, 394, 408, DIG. 30; 209/36, 37, 138, 139.1, 140, 141, 714; 110/203, 216, 165 A

[56] References Cited

U.S. PATENT DOCUMENTS

| | | |
|---|---|---|
| 459,570 | 9/1891 | Beynon . |
| 688,810 | 12/1901 | Raymond . |
| 3,770,124 | 11/1973 | Frangquist . |
| 4,511,462 | 4/1985 | Folsberg . |
| 4,653,699 | 3/1987 | Schlessing . |
| 4,684,069 | 8/1987 | Hashimoto et al. . |
| 5,024,169 | 6/1991 | Borowy . |
| 5,622,321 | 4/1997 | Brundick et al. . |
| 5,624,039 | 4/1997 | Folsberg . |
| 5,887,724 | 3/1999 | Weyand et al. . |
| 5,887,725 | 3/1999 | Tominaga et al. . |

*Primary Examiner*—Richard L. Chiesa
*Assistant Examiner*—Fred Prince
*Attorney, Agent, or Firm*—Arthur E. Fournier, Jr.

[57] ABSTRACT

A method of separating unburned Carbon, as particulate matter, from the flyash produced as a result of the combustion process occurring in a pulverized-coal fired steam generating power plant is disclosed. More particularly the invention separates the flyash into a coarse product group and a fine product group by utilizing the differences in specific gravity between the Carbon particles and remaining flyash as well as utilization of the dynamic classification characteristics of a rotary classifier to effect the separation whereby at least one of the two product groups comprises a relatively low weight percentage of unburned Carbon while yet comprising a relatively high percentage of the total mass of product recovered after separation.

20 Claims, 8 Drawing Sheets

SEPARATING CARBON FROM ASH

BACKGROUND OF THE INVENTION

This invention relates to a method of separating unburned Carbon, as particulate matter, from the flyash produced as a result of the combustion process occurring in a pulverized-coal fired steam generating power plant and more particularly to the separation of the flyash into a coarse product group and a fine product group utilizing the differences in specific gravity between the Carbon particles and remaining flyash as well as the use of a rotary classifier to effect the separation whereby at least one of the two product groups comprises a relatively low weight percentage of unburned Carbon while yet comprising a relatively high percentage of the total mass of product recovered after separation.

For use in a pulverized-coal fired steam generating power plant raw coal is usually crushed in a pulverizer to a very fine powder and then injected into the furnace of the steam generator where it is combusted in air. The combustion process may typically result in a rotating flame envelope of hot flue-gases called a "fireball." The hot flue-gases rise within the furnace giving up heat to the working fluid of a thermodynamic steam cycle to produce steam. The flue-gases then exit the furnace through a horizontal pass and are directed to and through a backpass. The horizontal pass and backpass commonly contain heat exchange surfaces which interact with the flue-gases to superheat and reheat the steam. The flue-gases then typically pass from the backpass to an air preheater where, in a heat exchange process, air is heated prior to use in the furnace combustion process. From the air preheater the flue-gases are directed to a flue-gas cleansing apparatus—usually an electrostatic precipitator, a fabric filter, a selective or nonselective catalytic reduction chamber or some combination thereof. Finally the flue-gases are directed to a stack and thence vented to the atmosphere.

Raw coal, as mined, typically contains, among other constituents, varying percentages of fixed Carbon, ash, volatile matter and water. However, as a result of the incomplete combustion of the coal constituents, the resulting flue-gases are laden with particulate matter; including unburned Carbon particles. Depending upon its nature, this combination of unburned Carbon and other particulate matter is generally referred to as bottom ash or flyash. Bottom ash is slag which builds up on the heat-absorbing surfaces of the furnace, superheater and reheater and falls, either by its own weight or as a result of load changes in the power plant or by sootblowing, to the bottom of the furnace where it is collected in a hopper. In contrast, flyash is carried along with the flue-gases in the flow path described above where it is collected at several points; namely at the exit to the backpass in an economizer ash hopper, after passing through the air preheater in an air heater ash hopper and in hoppers at the flue-gas cleansing apparatus.

The presence of the unburned Carbon particles in the flyash is due to, among other things, furnace design, the mineral content of the coal, the particle size of the pulverized-coal, the furnace temperature and the stoichiometry of the combustion process. If the flyash can be made to be less than 5% unburned Carbon by weight it becomes a commercially valuable byproduct. In particular it can be used beneficially as a cement and concrete admixture, as blasting grit, or in roofing materials, snow and ice control and structural landfills. However, if the unburned Carbon content of the flyash is above 5% the flyash has no commercial value and must be disposed, usually by expensive and environmentally hazardous landfilling methods.

Given that a typical utility boiler rated at 400 MWe firing a 10% ash coal may create over 90,000 tons of flyash per year it can be seen that if the flyash can be sold rather than disposed, the economic benefits to power plant owners can be substantial. Considerable efforts have been expended in the precombustion and combustion stages of pulverized-coal firing in attempts to maintain the resulting unburned Carbon in flyash at less than 5%. For instance, pulverizer design has been continuously improved to provide finer and finer particle sizes to in turn improve the combustion of coal, lower $NO_x$ emissions and reduce the content of unburned Carbon in flyash. The continued reduction in coal particle sizes can be seen through the evolution of whizzer classifiers, static classifiers and rotary classifiers. However, even the use of rotary classifiers may not reduce the levels of unburned Carbon in flyash to desirable levels. This could occur, for example, if the coal is of lower reactivity or if the operation of the pulverizer system limits the performance of the rotary classifier. In addition, it is illustrative that the subject matter of U.S. Pat. No. 5,315,939, entitled "Integrated Low $NO_x$ Tangential Firing System," issuing on May 31, 1994 and assigned to the same assignee as the present application, relates to a tangential firing system wherein the $NO_x$ emission target is to be achieved through combustion techniques only, while maintaining Carbon-in-flyash at less than 5% and CO emissions at less than 50 ppm.

Other methods to maintain the resulting unburned Carbon in flyash at desired levels have also been utilized. To that extent, representative of the prior is U.S. Pat. No. 5,024,169, entitled "Process To Refine Flyash Captured From Pulverized Coal Fired Boilers And Auxiliary Equipment" which issued on Jun. 18, 1991 and discloses a process and apparatus for the refinement of exhaust particulate matter from a boiler or other device burning an organic fuel such as coal. Further in the prior art is found U.S. Pat. No. 5,160,539, entitled "Method And Product Of Fly Ash Benefication By Carbon Burnout In A Dry Bubbling Fluid Bed" which issued on Nov. 3, 1992 and discloses a method of reducing Carbon content of fine particles of flyash containing Carbon. Also in the prior art, U.S. Pat. No. 5,399,194, entitled "Method Of Fly Ash Beneficiation And Apparatus For Same" and issuing on Mar. 21, 1995, discloses an invention which relates to beneficiation by oxidation of fine particles of carbonaceous flyash and more particularly beneficiation of fine particles of flyash having low incipient agglomeration temperatures.

It is also desirable to maintain the amount of unburned Carbon in the flyash by mechanical means. Such a method is simple, versatile and cost effective and may be incorporated in new power plant design or in retrofit applications.

As evidenced in the prior art, the need to separate particulate matter is not new. Typical methods for effecting the separation of particulate matter often utilize gravitational or centrifugal forces or some combination thereof. In particular, U.S. Pat. No. 580,145, entitled "Pneumatic Separator" and which issued on Apr. 6, 1897, teaches a separator in which the material to be separated is carried by a moving air-current and the separation is effected by gravity. Further in the prior art, U.S. Pat. No. 687,266, entitled "Pneumatic Separator" and which issued on Nov. 26, 1901, discloses separators employed for extracting the finer from the coarser particles of various pulverized materials, as ores, marble, gypsum, cements, sand, coal, etc., in which a diminishing force of an air-current acts against gravity. Still further, U.S. Pat. No. 688,810, entitled "Pneumatic Separator" and which issued on Dec. 10, 1901, teaches pneumatic separators of that class in which the material to be separated is carried by an air-current and the separation effected by gravity. Yet further in the prior art, U.S. Pat. No. 1,783,357, entitled "Mechanical Separator" and which issued on Dec. 2, 1930, teaches an improved means for insuring the separation from the rising air stream, of all of the heavier particles of material. Yet again in the prior art, U.S. Pat. No. 3,865,242, entitled "Upstream Classifier For A Multi-Separator" and which issued on Feb. 11, 1975, discloses a multi-separator processing organization for effectively classifying a flow stream containing particulate matter of various densities into plural fractions according to the density characteristics of each.

The use of centrifugal forces to effect the separation of particulate matter is also seen in the prior art. In particular U.S. Pat. No. 2,195,618, entitled "Adjustable Separator" and which issued on Apr. 2, 1940, relates to new and useful improvements in adjustable mechanical separators, and more particularly to improved means for grading or determining, within certain limits, the fineness of the material that is delivered from the separator. Also in the prior art, U.S. Pat. No. 3,770,124, entitled "Swing Back Whizzer Blades For Mechanical Air Separator" and which issued on Nov. 6, 1973, teaches a mechanical separator for selectively dividing an already finely divided solid into two products. Furthermore, U.S. Pat. No. 4,653,699, entitled "Coal-Mill Classifier" and which issued on Mar. 31, 1987, discloses a centrifugal air classifier, of the type particularly suitable for use with coal mills, comprising a coaxial course-material collecting hopper which is arranged in the truncated-cone-shaped classifier housing and into which the material to be classified enters with the carrier gas through a spin-generating ring of regulating flaps and from which the mixture of fine material and carrier gas emerges from the classifier through a coaxial baffle tube and the coarse material is removed through the open lower end of the collecting hopper.

The separation of particulate matter may also be accomplished, as alluded to above, by what are generally known as static classifiers and rotary classifiers. These types of classifiers are commonly seen in the art of pulverizing raw coal before its introduction into the furnace of a steam generating power plant for combustion therein. In a static classifier a flow of air, combined with coal particles entrained therein which have undergone a first pulverizing action, is directed through a series of stationary turning vanes which make up a convoluted flow path through a pulverizer. Said turning vanes are canted at an angle to the direction of the flow of the stream of air and coal particles so as to cause the coarsest (and therefore heaviest) particles to fall out of the air stream and suffer a second pulverizing action while the relatively finer coal particles pass through the classifier and are delivered to the furnace for combustion. U.S. Pat. No. 4,684,069 discloses a prior art static type of vertical mill.

In a rotary classifier the flow of air, combined with the initially pulverized-coal particles entrained therein, is directed through a series of squirrel cage like vanes disposed as an inverted, truncated cone revolving about the central vertical axis of a pulverizer housing at a predetermined rotational velocity. The vanes are canted at an angle to the direction of the flow of the stream of air so as to present to the stream a "window" through which the stream of air and certain coal particles may pass unimpeded. The width of the window is variable in that as the rotational velocity of the vanes is increased the window is made narrower and as the rotational velocity of the vanes is decreased, the window is made wider. The rotational velocity of the vanes coupled with the velocity of the air stream acts to separate the coal particles into two groups. A first group of particles are those that are relatively coarse or heavy and therefore moving too slowly to pass unimpeded through the aforesaid window. These particles collide with the vanes and fall out of the air/coal stream and are returned to suffer a second pulverizing action. A second group of particles are those that are relatively fine or light and are therefore moving fast enough to pass unimpeded through the window and thus through the pulverizer to the furnace of the steam generator for combustion therein. For a fixed velocity of the air stream, by the judicious manipulation and control of the aforesaid rotational velocity of the vanes, the relative fineness of the two groups of coal particles may be adjusted, i.e., by increasing the rotational velocity of the vanes, the fineness of the coal particles that pass through the aforesaid window increases. In other words, only finer and finer particles are capable of passing unimpeded as rotational velocity increases and while yet coarser and coarser coal particles are capable of passing unimpeded as rotational velocity is reduced. Conversely, for a fixed rotational velocity of the vanes, by the judicious manipulation and control of the aforesaid velocity of the air stream, the relative fineness of the two groups of coal particles may again be adjusted, i.e., by increasing the velocity of the air stream, the fineness of the coal particles that pass through the aforesaid window decreases. In other words finer and finer particles will pass unimpeded as air velocity decreases and coarser and coarser coal particles will pass unimpeded as air velocity is increased. In this regard U.S. Pat. No. 2,092,310, entitled "Rotary Classifier For Pulverizers And The like" and which issued on Sep. 7, 1937, relates to rotary classifiers adapted for use in material pulverizers in which the pulverized material is removed by a gaseous carrier medium. Furthermore, U.S. Pat. No. 4,684,069 also discloses a prior art rotary blade type of vertical mill. Still further in the prior art, U.S. Pat. No. 5,622,321, entitled "Mill Classifier" and which issued on Apr. 22, 1997, relates to a mill classifier, sifter or separator and in particular a roller mill classifier having a static classifier and a dynamic classifier and an annular classifying zone formed between these two classifiers, in which the static classifier is constituted by a radially outward positioned distributor having guide blades and the dynamic classifier is constituted by a ledge rotor. Also in the prior art U.S. Pat. No. 5,624,039, entitled "Separator For Sorting Particular Material" and which issued on Apr. 29, 1997, relates to a separator for sorting of particulate material suspended in a conveying gas into a fine fraction and a coarse fraction.

Thus, although methods to effect the separation of particulate matter, such as those practiced in accordance with the teachings of the above referenced U.S. patents, have been demonstrated to be operative for the purpose for which they have been designed, i.e., the separation of particulate matter by size, there has nevertheless been evidenced in the prior art a need for such particle separation methods to be improved.

In particular it is desirable to be able to effect the separation of particulate matter based upon particle type as opposed to simply particle size. The current invention proposes to mechanically separate particulate matter based upon particle type, and in particular to separate unburned Carbon particles from a collection of unburned Carbon particles and other particulate matter, collectively known as flyash, at prescribed locations along the flue-gas flow path described above. The separation is such that a fine product group and a coarse product group are produced wherein the coarse product group contains a relatively small percentage by weight of unburned Carbon while yet comprising a relatively high percentage of the total mass of product recovered after separation. The separation is accomplished by taking advantage of the differences in the specific gravities of the unburned Carbon and remaining flyash in conjunction with the use of the dynamics of a rotary classifier. The unburned Carbon particles are significantly lower in specific gravity than the remaining flyash and are commonly of a different size range. Flyash material, which includes unburned Carbon particles, is entrained within and conveyed by way of a fluid stream, at a controllable mass flow rate, into a separator housing and accelerated upwards through an annular opening of relatively small cross sectional area created by a collection cone disposed within the separator housing. Next, upon entering an expansion chamber of greater cross sectional area, the larger and heavier particles entrained within the fluid stream fall by gravity into the collection cone due to an abrupt decrease in the velocity of the fluid stream. These particles exit the separator as a coarse product group. The lighter, smaller particles continue to be conveyed with the fluid stream upwards toward a rotary classifier revolving at a controllable rotational velocity. Only the lighter Carbon particles and very small flyash particles, having sufficient velocity, pass through the aforesaid window of the rotary classifier to become a fine product group. The balance of these particles, i.e., the larger Carbon and middling size flyash particles, lacking sufficient velocity, are struck by the rotating classifier vanes and thereby rejected. These particles in turn fall into the collection cone and become part of the coarse product group.

It is therefore an object of the present invention to provide a new and improved method of separating particulate matter based upon differences in the specific gravity of the particulate matter.

It is also an object of the present invention to provide a new and improved method of separating particulate matter based upon differences in the velocity of the particulate matter in a fluid stream.

In particular, it is an object of the present invention to provide a new and improved method of separating unburned Carbon particles from the collected flyash produced as a result of the combustion process occurring in a pulverized-coal fired steam generating power plant.

It is also an object of the present invention to provide a new and improved method of separating unburned Carbon particles from the collected flyash produced as a result of the combustion process occurring in a pulverized-coal fired steam generating power plant when not able to do so by boiler efficiency alone.

It is yet a further object of the present invention to provide such a new and improved method of separating the unburned Carbon particles from the collected flyash produced as a result of the combustion process occurring in a pulverized-coal fired steam generating power plant such that through the use thereof there are derived a first product group and a second product group.

It is still further an object of the present invention to provide such a new and improved method of separating the unburned Carbon particles from the flyash produced as a result of the combustion process occurring in a pulverized-coal fired steam generating power plant such that through the use thereof at least one of the product groups contains a relatively small weight percentage of unburned Carbon while yet comprising a relatively high percentage of the total mass of product recovered after separation.

SUMMARY OF THE INVENTION

In accordance with one aspect of the present invention there is provided a method of separating unburned Carbon as particulate matter from the flyash produced as a result of the combustion process occurring within the furnace of a pulverized-coal fired steam generating power plant. The method comprises the steps of effecting a separation of the flyash-laden flue-gas stream as a function of the difference in a property between a gas component of the flue-gas stream and a particle component thereof. It is such that the gas component is more apt to flow along a first fluid flow path and the particle component is more apt to flow along a second fluid flow path. The portion of the flue-gas stream flowing along the second fluid flow path has entrained therein a quantity of flyash containing a first fraction of particles including at least unburned Carbon particles and a second fraction of other particulate matter. The particles of the first fraction have a relatively higher specific gravity than the particles of the second fraction. In addition, as a function of the difference in the specific gravities of the first and second fractions in the quantity of flyash, a separation is effected of the quantity of flyash into a first product group and an interim product group. It such that the ratio of the number of second fraction particles having relatively lower specific gravities in the interim product group to the number of second fraction particles having relatively lower specific gravities in the at least one of said first or second portions is greater than the ratio of the number of first fraction particles having relatively higher specific gravities in the interim product group to the number of first fraction particles having relatively higher specific gravities in the at least one of said first or second portions. Also, effecting a separation of the interim product group.

In accordance with a second aspect of the present invention there is provided a system for separating unburned Carbon as particulate matter from the flyash produced as a result of the combustion process occurring within the furnace of a pulverized-coal fired steam generating power plant. The system comprises means for effecting a separation of the flyash-laden flue-gas stream as a function of a difference in a property between a gas component of the flue-gas stream and a particle component thereof such that the gas component is more apt to flow along a first fluid flow path and the particle component is more apt to flow along a second fluid flow path. The portion of the flue-gas stream flowing along said second fluid flow path having entrained therein a quantity of flyash containing a first fraction of particles including at least unburned Carbon particles and a second fraction of other particulate matter. The particles of the first fraction having a relatively higher specific gravity than the particles of the second fraction. The system also includes means for effecting a separation of said quantity of flyash into a first product group and an interim product group as a function of the difference in the specific gravities of the first and second fractions in said quantity of flyash such that the ratio of the number of second fraction particles having relatively lower specific gravities in the interim product group to the number of second fraction particles having relatively lower specific gravities in the at least one of said first or second portions is greater than the ratio of the number of first fraction particles having relatively higher specific gravities in the interim product group to the number of first fraction particles having relatively higher specific gravities in the at least one of said first or second portions. The system also includes means for effecting a separation of the interim product group.

DESCRIPTION OF THE PREFERRED EMBODIMENT

Figure 1:
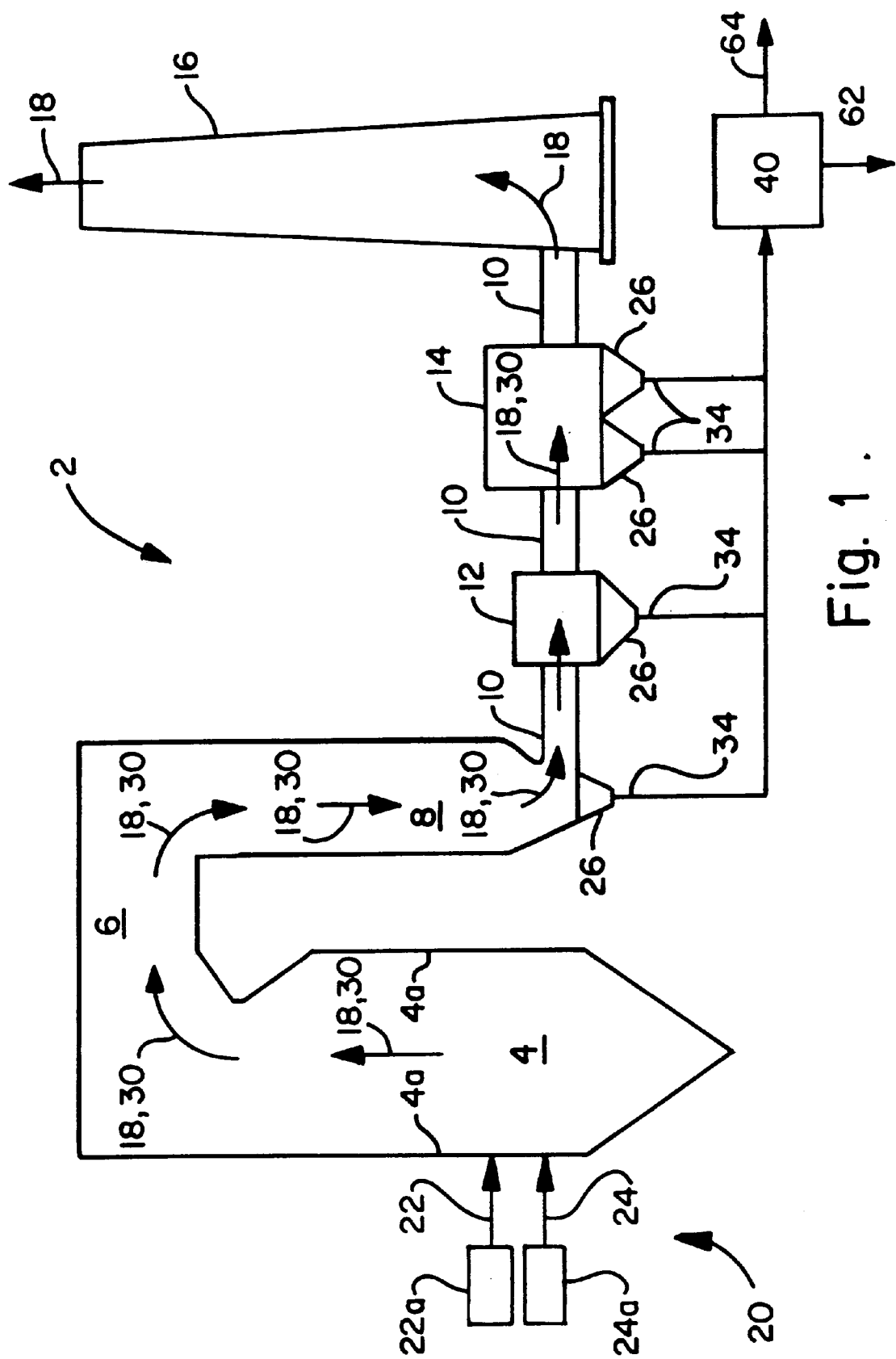
FIG. 1 is a generalized schematic diagram of a pulverized-coal fired steam generating power plant as it is generally comprised of a furnace volume, a horizontal pass, a backpass volume, an air preheater, a flue-gas cleansing apparatus, a stack, interconnecting ductwork and flyash collection points attached thereto.

Referring now to FIG. 1 depicted therein is a schematic representation in the nature of an elevation of a fossil-fuel fired steam generator 2. As depicted in FIG. 1 the fossil-fuel fired steam generator 2 generally comprises a furnace volume 4, a horizontal pass 6, a backpass volume 8, ductwork 10 to an air preheater 12 thence to a flue-gas cleansing apparatus 14 and a stack 16. Inasmuch as the nature of the construction and the mode of operation of fossil-fuel fired steam generators are well known to those skilled in the art, it is not deemed necessary to set forth a detailed description thereof. Rather, for purposes of obtaining an understanding of a fossil-fuel fired steam generator 2, it is deemed sufficient that there be presented herein merely a description of the nature of the components of the fossil-fuel fired steam generator 2 with which the present invention cooperates. For a more detailed description of the nature of the construction and mode of operation of the components of such a fossil-fuel fired steam generator, for instance a pulverized-coal burning steam generator, reference may be had to the prior art, e.g., U.S. Pat. No. 4,719,587, which issued Jan. 12, 1988 and which is assigned to the same assignee as the present patent application.

Reference is again had to FIG. 1 and in particular to the furnace volume 4 of the fossil-fuel fired steam generator 2. It is within the furnace volume 4 that, in a manner well known to those skilled in the art, combustion of fuel and air occurs. Hot gases 18 are produced from this combustion. These hot gases 18, generally known as flue-gases 18, rise upwardly within the furnace volume 4 and in accordance with a predefined thermodynamic steam cycle give up energy to a working fluid. This working fluid flows through furnace waterwall tubes 4a which, in a conventional manner, form the four walls that serve to define therewithin the furnace volume 4. The flue-gases 18 then exit the furnace volume 4 through the horizontal pass 6 and are directed to and through the backpass volume 8 of the steam generator 2. Both the horizontal pass 6 and the backpass volume 8 commonly contain additional heat exchange surfaces integral to the thermodynamic steam cycle (not shown in the interest of maintaining clarity of illustration in the drawing). Such additional heat exchange surfaces are operative for superheating and reheating steam in a manner well known to those skilled in the art. Thereafter, the steam produced from the energy given up to the working fluid commonly is made to flow to a turbine (not shown), which forms one component of a turbine/generator set (not shown). This steam provides the motive power to drive the turbine, which thence drives the generator, which in known fashion is cooperatively associated with the turbine such that electricity is produced from the generator.

Referring further to FIG. 1, also depicted therein is a schematic representation of a means, generally designated by the reference numeral 20, for supplying fuel 22 and air 24 to the furnace volume 4. The fuel and air supply means 20 is so designed and constructed as to transport fuel 22 and air 24, separately or if need be in combination, from a fuel source 22a and an air source 24a to the furnace volume 4 for combustion therein. Also shown in FIG. 1 is ductwork 10 operative for the purpose of conveying the aforementioned flue-gases 18 from the backpass volume 8 to an air preheater 12 thence to a means 14 for cleansing the flue-gases 18 and finally to a stack 16 which vents the flue-gases 18 to the atmosphere. It should be understood from FIG. 1 that, due to the combustion process occurring within the furnace volume 4, there is laden within the flue-gases 18 flyash 30 comprising unburned Carbon and other particulate matter. Furthermore, strategically located along the flow path of the flue-gases 18 there is disposed at least one flyash collection means 26 for collecting the flyash. Such flyash collection means 26 are commonly located at the exit to the backpass volume 8, at the air preheater 12 and at the flue-gas cleansing apparatus such as an electrostatic precipitator 14. It is at these locations that the method of the present invention is practiced.

Figure 2:
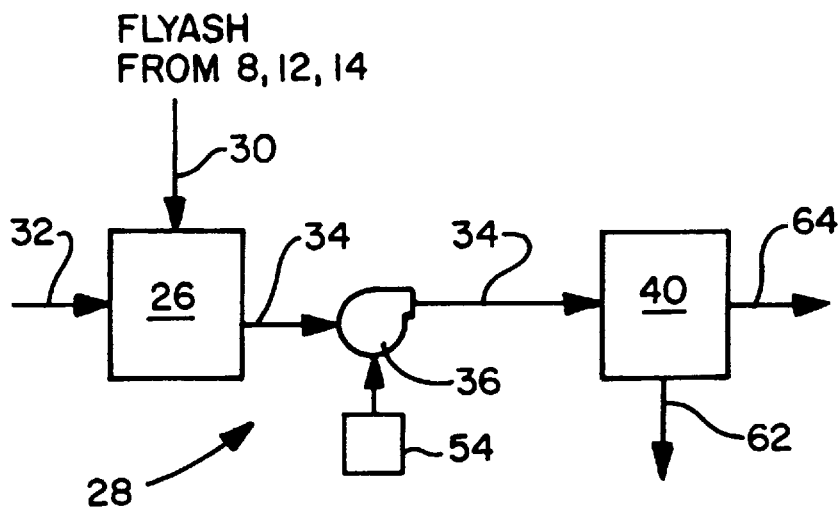
FIG. 2 is a generalized schematic diagram of a method of separating unburned Carbon particles from the flyash produced as a result of the combustion process occurring within a pulverized-coal fired steam generating power plant.

Reference is now had to FIG. 2. Therein depicted is a generalized schematic diagram of a method 28 for implementing the present invention. More particularly, it is to be understood from FIG. 2 that flyash 30, generated during the aforesaid combustion of pulverized-coal, and containing unburned Carbon particles, is collected in the flyash collecting means 26 after a first separation thereof and thence entrained in a fluid stream 32 introduced thereto producing thereby a flyash-entrained fluid stream 34. The flyash-entrained fluid stream 34, is conveyed, under the motive power of a conventional fluid conveying means 36 and first motive power means 54, via conventional piping or ductwork (not shown) to a separator 40 from which emerges a first, or coarse, product group 62 and a second, or fine, product group 64.

Figure 2A:
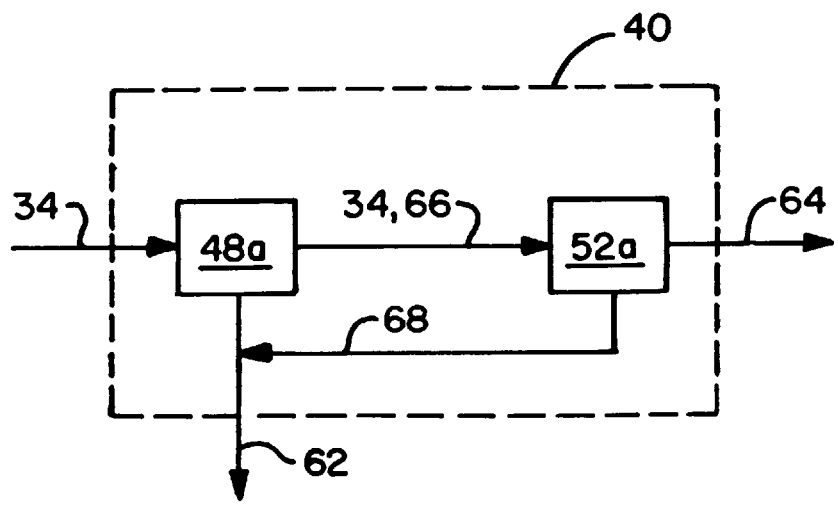
FIG. 2a is a generalized schematic diagram of a separator including a first separation means and a second separation means capable of use in conjunction with the present invention.
Figure 3:
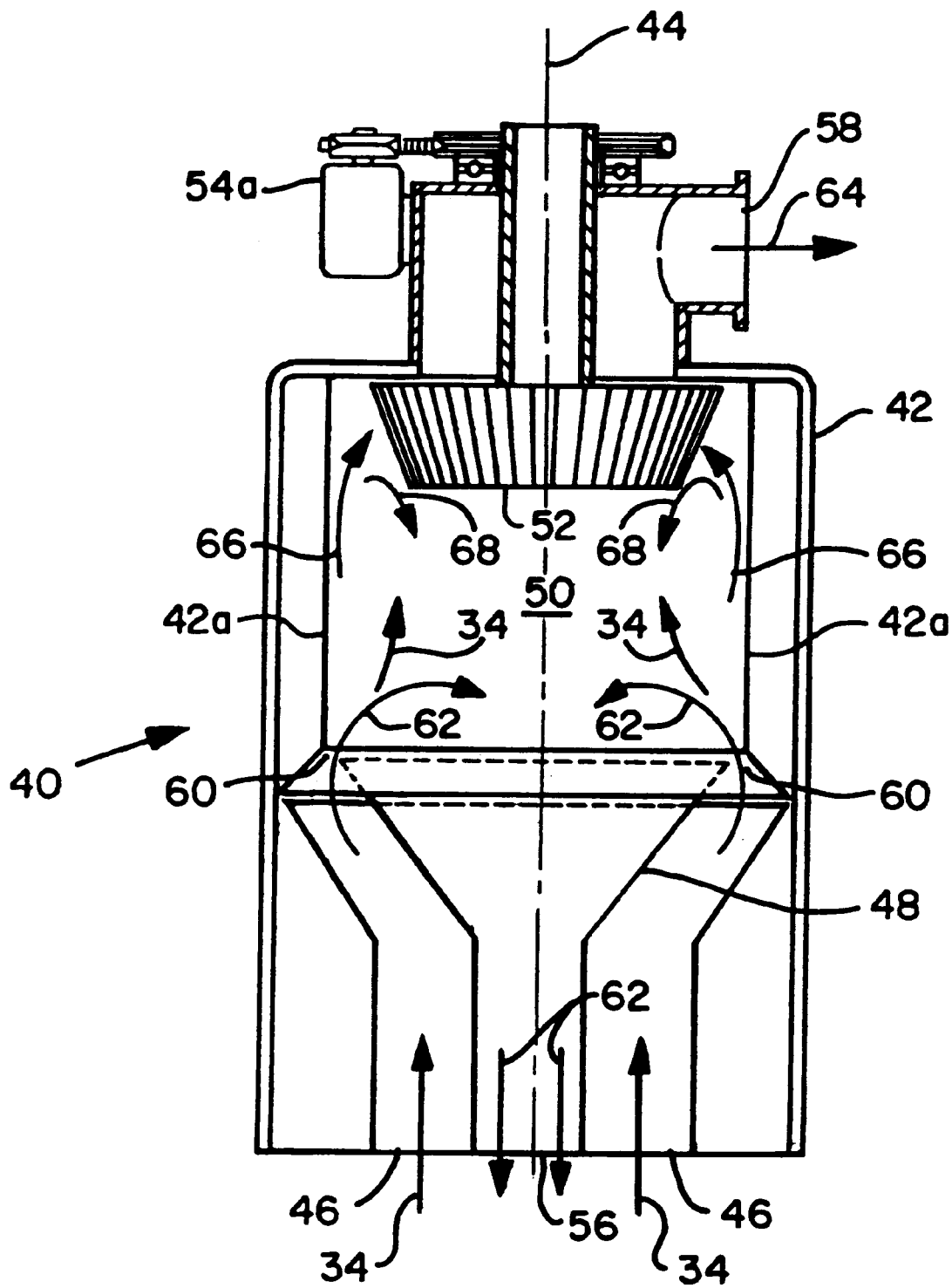
FIG. 3 is a schematic diagram in the nature of a sectional side elevation view of a separator capable of use in separating unburned Carbon particles from the flyash produced as a result of the combustion process occurring in a pulverized-coal fired steam generating power plant.

Reference is now had to FIG. 2a and FIG. 3. FIG. 2a is a generalized schematic diagram of a separator 40 including a first separation means 48a and a second separation means 52a capable of use in conjunction with the present invention so as to effect a second separation of the flyash-laden flue-gas stream 18, 30 into a first product group 62 and a second product group 64. FIG. 3 depicts, by way of exemplification and not limitation, said separator 40, generally comprising a housing 42 having interior walls 42a, an axis 44 central thereto, a fluid inlet means 46 at the lower segment of the housing 42, an inverted, truncated collector cone 48 coaxial with the axis 44, an expansion chamber 50, a rotary classifier 52, second motive power means 54a for imparting rotational velocity to the rotary classifier 52, a first fluid exit means 56 and a second fluid exit means 58. The collector cone 48 is so disposed within the housing 42 as to create an annular opening 60 between the periphery of the collector cone 48 and the interior of the housing 42. The annular opening 60 possesses a first cross sectional area. It is to be understood from FIG. 3 that the flyash-entrained fluid stream 34, is introduced into the lower segment of the separator 40 via the fluid inlet means 46 at a controllable mass flow rate. The flyash-entrained fluid stream 34 flows upward within the housing 42 from the fluid inlet means 46 around the collector cone 48 and through the annular opening 60 at a relatively high velocity. The flyash-entrained fluid stream 34 passes through the annular opening 60 into the expansion chamber 50 which possesses a second cross sectional area much greater than the first cross sectional area. It is envisioned that the ratio of the second cross sectional area to the first cross sectional area may be in the range of from 15:1 to 20:1. The abrupt increase in the cross sectional area through which the flyash-entrained fluid stream 34 flows causes a concomitantly abrupt decrease in the linear velocity of the flyash-entrained fluid stream 34. This loss in velocity causes some relatively heavy unburned Carbon particles and other relatively heavy flyash 62 to fall out of the flyash-entrained fluid stream 34 into the collector cone 48 to form a coarse product group 62 at the first fluid exit means 56. Those unburned Carbon particles and other flyash 66 not so heavy as to fall out of the flyash-entrained fluid stream 34 continue to be conveyed through the expansion chamber 50 in an interim product group 34, 66 to the rotary classifier 52. The rotary classifier 52 is rotating at a controllable rotational velocity under the motive power of a second motive power means 54a and those unburned Carbon particles and other flyash 64 possessing sufficient velocity will pass through the rotary classifier 52 to form a fine product group 64 at the second fluid exit means 58. However, those unburned Carbon particles and flyash 68 lacking sufficient velocity to pass through the rotary classifier 52 are rejected and fall into the collector cone 48 to join the aforesaid coarse product group 62 at the first fluid exit means 56.

Figure 4:
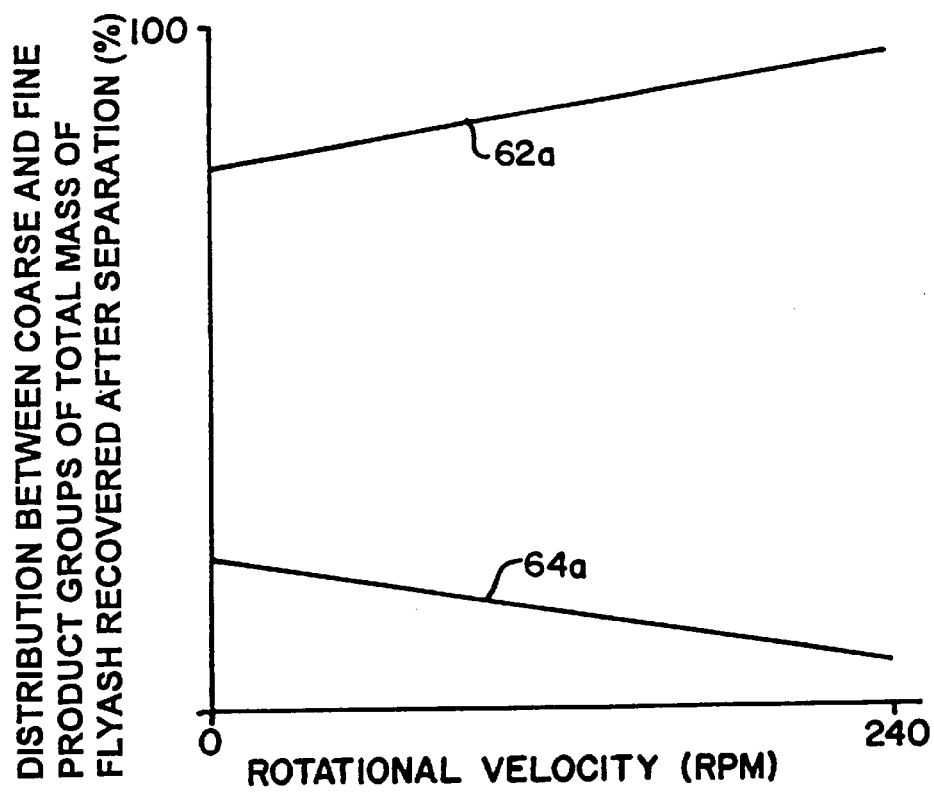
FIG. 4 is a graphical presentation, at a first mass flow rate, of the distribution, in percentage, between the coarse product group and the fine product group of the total mass of flyash recovered after separation as a function of classifier speed.
Figure 4A:
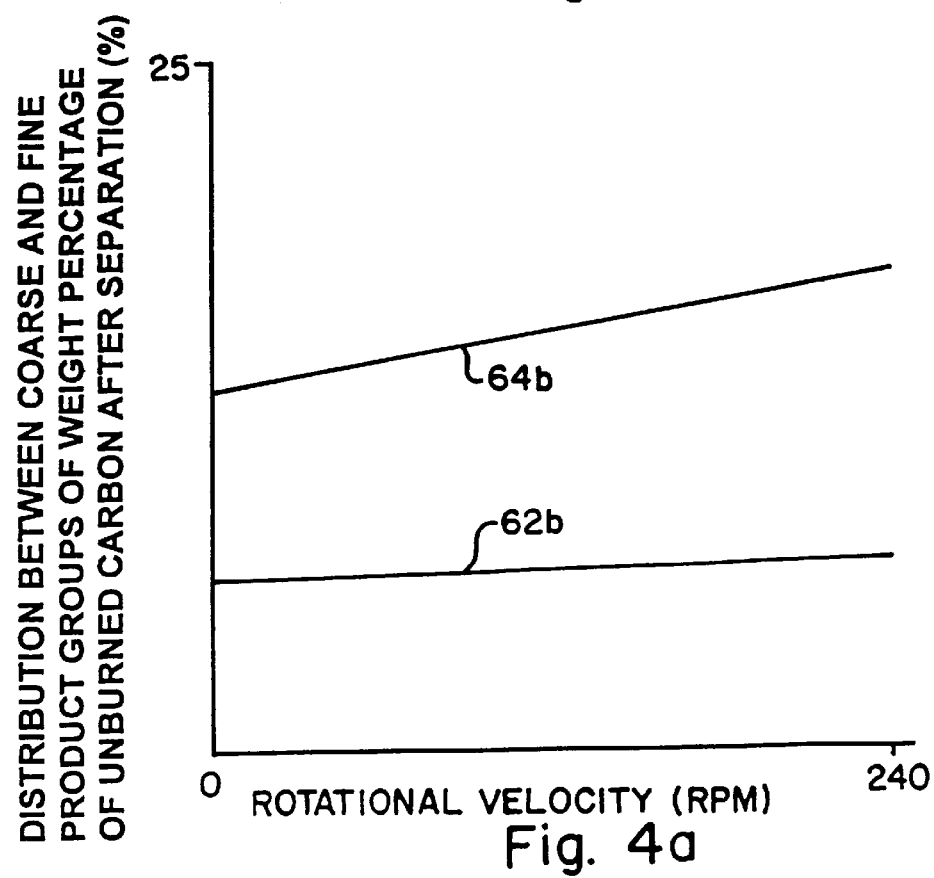
FIG. 4a is a graphical presentation, to be viewed in conjunction with FIG. 4, at the first mass flow rate of the distribution between the coarse product group and the fine product group of the weight percentage of unburned Carbon in the respective product groups after separation, as a function of rotational velocity.

In accordance with the method of the present invention, by the judicious manipulation and control of the mass flow rate of the flyash-entrained fluid stream 34 and the rotational velocity of the rotary classifier 52 it is possible to separate the flyash-entrained fluid stream 34 into a coarse product group 62 and a fine product group 64 whereby at least one of the product groups 62, 64 has a relatively low weight percentage of unburned Carbon while yet comprising a relatively high percentage of the total mass of product recovered after separation. The invention has been demonstrated using a mixture of pulverized-coal as the unburned Carbon particles and a noncombustible host material with characteristics similar to boiler flyash. Experimental results can best be seen with reference to FIG. 4, FIG. 4a, FIG. 5, FIG. 5a, FIG. 6, FIG. 6a, FIG. 7, FIG. 7a and FIG. 8. It should be noted that FIGS. 7 and 7a are three dimensional representations of the content of FIGS. 4, 5 and 6 and FIGS. 4a, 5a and 6a respectively and are intended to supplement those figures for the purpose of any needed clarification. The aforesaid figures are graphical presentations of a plurality of functional relationships representative of the total mass of flyash recovered after separation as a function of mass flow rate and rotational velocity; and the weight percentage of unburned Carbon in the respective product groups 62, 64 after separation as a function of mass flow rate and rotational velocity. FIG. 4 and FIG. 4a are graphical presentations that should be viewed together. FIG. 4 displays the distribution in percentage between the coarse product group 62 and the fine product group 64 of the total mass of flyash recovered after separation, as a function of the rotational velocity of the rotary classifier 52. FIG. 4a displays the distribution between the coarse product group 62 and the fine product group 64 of the weight percentage of unburned Carbon after separation, as a function of rotational velocity. It should be understood from FIG. 4 and FIG. 4a that the graphs depicted therein 62a, 62b, 64a, 64b are based upon a first mass flow rate of the flyash-entrained fluid stream 34 depicted in FIG. 2 of about 2216 lbs. of flyash per hour.

In comparing FIG. 4 and FIG. 4a it is noteworthy that the weight percentage of unburned Carbon is lowest in the coarse product group 62 as seen in the graph designated by the reference numeral 62b in FIG. 4a, while yet the coarse product group 62 comprises the highest percentage of total mass of flyash recovered after separation as seen in the graph designated by the reference numeral 62a in FIG. 4. In contrast, it is noteworthy that the weight percentage of unburned Carbon is highest in the fine product group 64 as seen in the graph designated by the reference numeral 64b in FIG. 4a, while yet the fine product group 64 comprises the lowest percentage of total mass of flyash recovered after separation as seen in the graph designated by the reference numeral 64a in FIG. 4. As seen in FIG. 4a, the weight percentage of unburned Carbon in the coarse product group 62b begins with a value of approximately 6% at a rotational velocity of zero and remains nearly constant to a rotational velocity of approximately 240 rpm. Also seen in FIG. 4a, the weight percentage of unburned Carbon in the fine product group 64b begins with a value of approximately 13% at a rotational velocity of zero and increases approximately linearly to a value of approximately 17% at a rotational velocity of approximately 240 rpm. In FIG. 4 the percentage of the total mass of flyash recovered in the coarse product group begins with a value of approximately 77% at a rotational velocity of zero and increases approximately linearly to a value of approximately 93% at a rotational velocity of approximately 240 rpm. Furthermore in FIG. 4 the percentage of the total mass of flyash recovered in the fine product group begins with a value of approximately 23% at a rotational velocity of zero and decreases approximately linearly to a value of approximately 7% at a rotational velocity of approximately 240 rpm.

Figure 5:
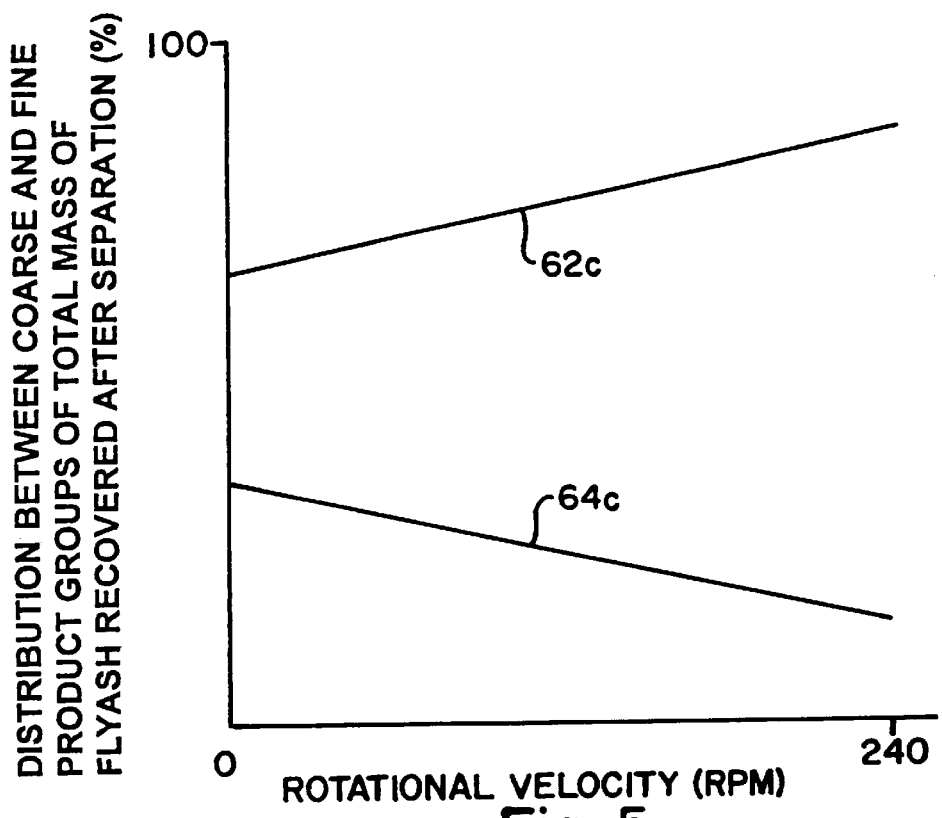
FIG. 5 is a graphical presentation, at a second mass flow rate, of the distribution, in percentage, between the coarse product group and the fine product group of the total mass of flyash recovered after separation as a function of rotational velocity.
Figure 5A:
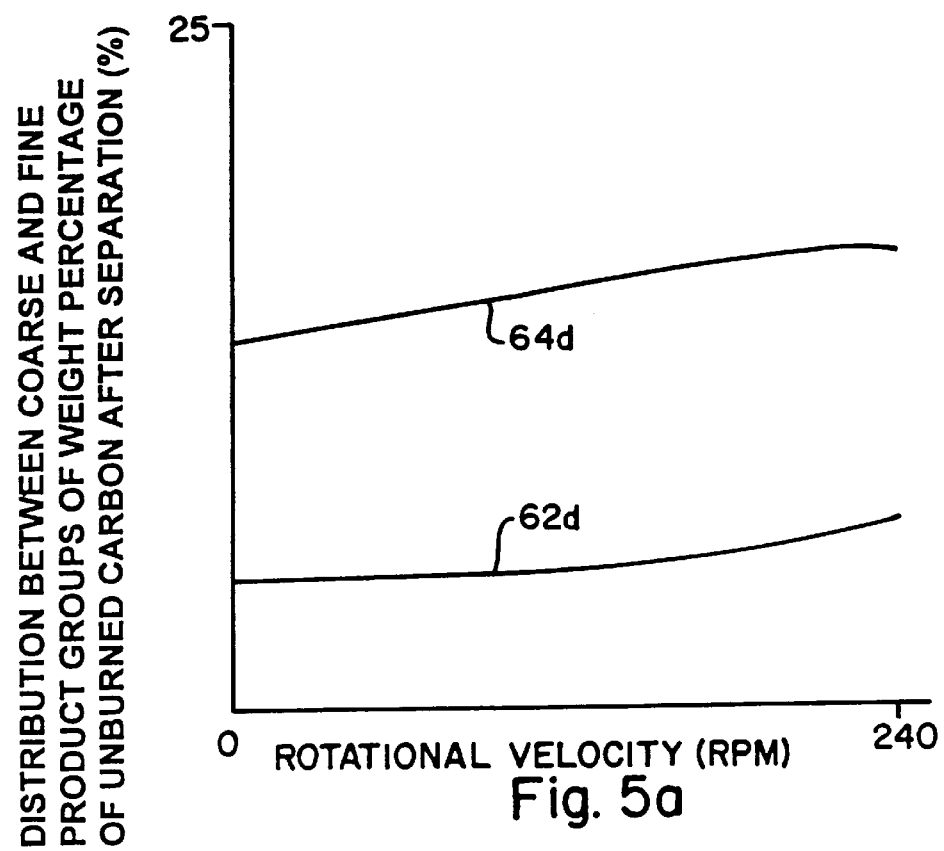
FIG. 5a is a graphical presentation, to be viewed in conjunction with FIG. 5, at the second mass flow rate of the distribution between the coarse product group and the fine product group of the weight percentage of unburned Carbon in the respective product groups after separation, as a function of rotational velocity.

Reference is now had to FIG. 5 and FIG. 5a. FIG. 5 and FIG. 5a are graphical presentations that should also be viewed together. FIG. 5 also displays the distribution in percentage between the coarse product group 62 and the fine product group 64 of the total mass of flyash recovered after separation, as a function of the rotational velocity of the rotary classifier 52. FIG. 5a also displays the distribution between the coarse product group 62 and the fine product group 64 of the weight percentage of unburned Carbon after separation, as a function of rotational velocity. It should be understood from FIG. 5 and FIG. 5a that these graphs 62c, 62d, 64c, 64d are based upon a second mass flow rate of the flyash-entrained fluid stream 34 of about 2903 lbs. of flyash per hour.

In comparing FIG. 5 with FIG. 5a it is noteworthy, as in FIG. 4 and FIG. 4a, that the weight percentage of unburned Carbon is lowest in the coarse product group 62 as seen in the graph designated by the reference numeral 62d in FIG. 5a, while yet the coarse product group 62 comprises the highest percentage of total mass of flyash recovered after separation as seen in the graph designated by the reference numeral 62c in FIG. 5. In contrast, it is again noteworthy that the weight percentage of unburned Carbon is highest in the fine product group 64 as seen in the graph designated by the reference numeral 64d in FIG. 5a, while yet the fine product group 64 comprises the lowest percentage of total mass of flyash recovered after separation as seen in the graph designated by the reference numeral 64c in FIG. 5. As seen in FIG. 5a, the weight percentage of unburned Carbon in the coarse product group 62d begins with a value of approximately 5% at a rotational velocity of zero and rises slowly to a value of about 6% at a rotational velocity of approximately 240 rpm. Also seen in FIG. 5a, the weight percentage of unburned Carbon in the fine product group 64d begins with a value of approximately 13% at a rotational velocity of zero and increases approximately linearly to a value of approximately 16% at a rotational velocity of approximately 240 rpm. In FIG. 5 the percentage of the total mass of flyash recovered in the coarse product group 62c begins with a value of approximately 63% at a rotational velocity of zero and increases approximately linearly to a value of approximately 85% at a rotational velocity of approximately 240 rpm. Furthermore in FIG. 5 the percentage of the total mass of flyash recovered in the fine product group 64c begins with a value of approximately 37% at a rotational velocity of zero and decreases approximately linearly to a value of approximately 15% at a rotational velocity of approximately 240 rpm.

Figure 6:
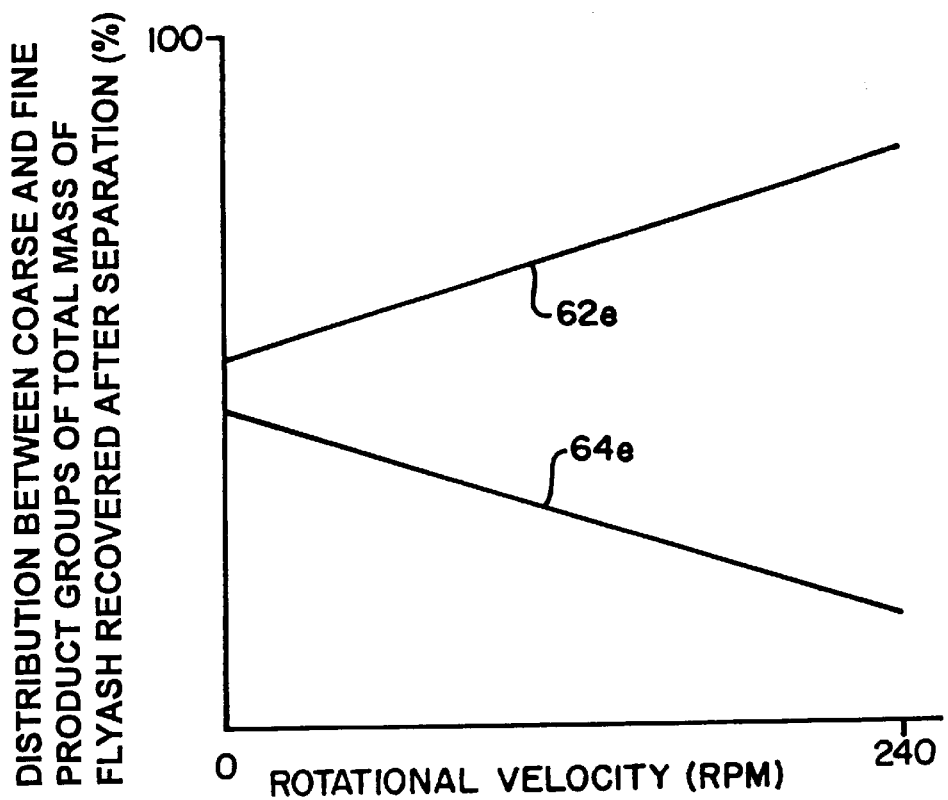
FIG. 6 is a graphical presentation, at a third mass flow rate, of the distribution, in percentage, between the coarse product group and the fine product group of the total mass of flyash recovered after separation as a function of rotational velocity.
Figure 6A:
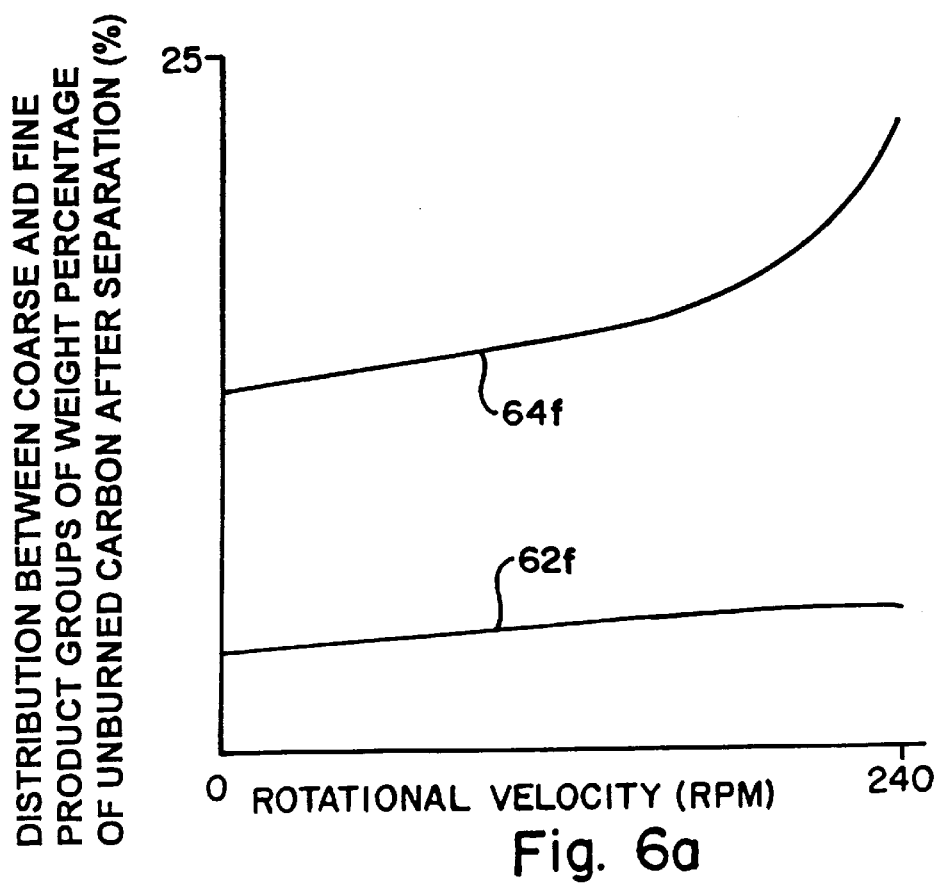
FIG. 6a is a graphical presentation, to be viewed in conjunction with FIG. 6, at the third mass flow rate, of the distribution between the coarse product group and the fine product group of the weight percentage of unburned Carbon in the respective product groups after separation, as a function of rotational velocity.
Figure 7:
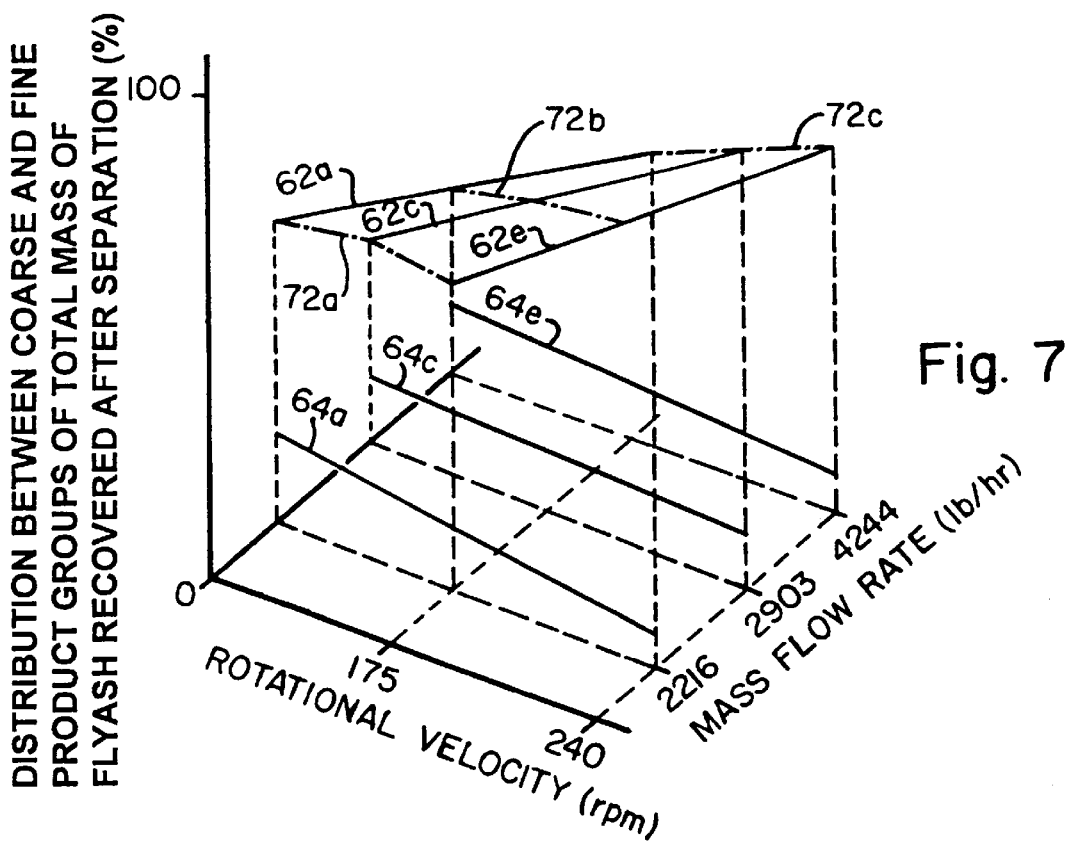
FIG. 7 is a graphical presentation, in three dimensions, of the distribution, in percentage, between the coarse product group and the fine product group of the total mass of flyash recovered after separation as a function of rotational velocity at the first, second and third mass flow rates.
Figure 7A:
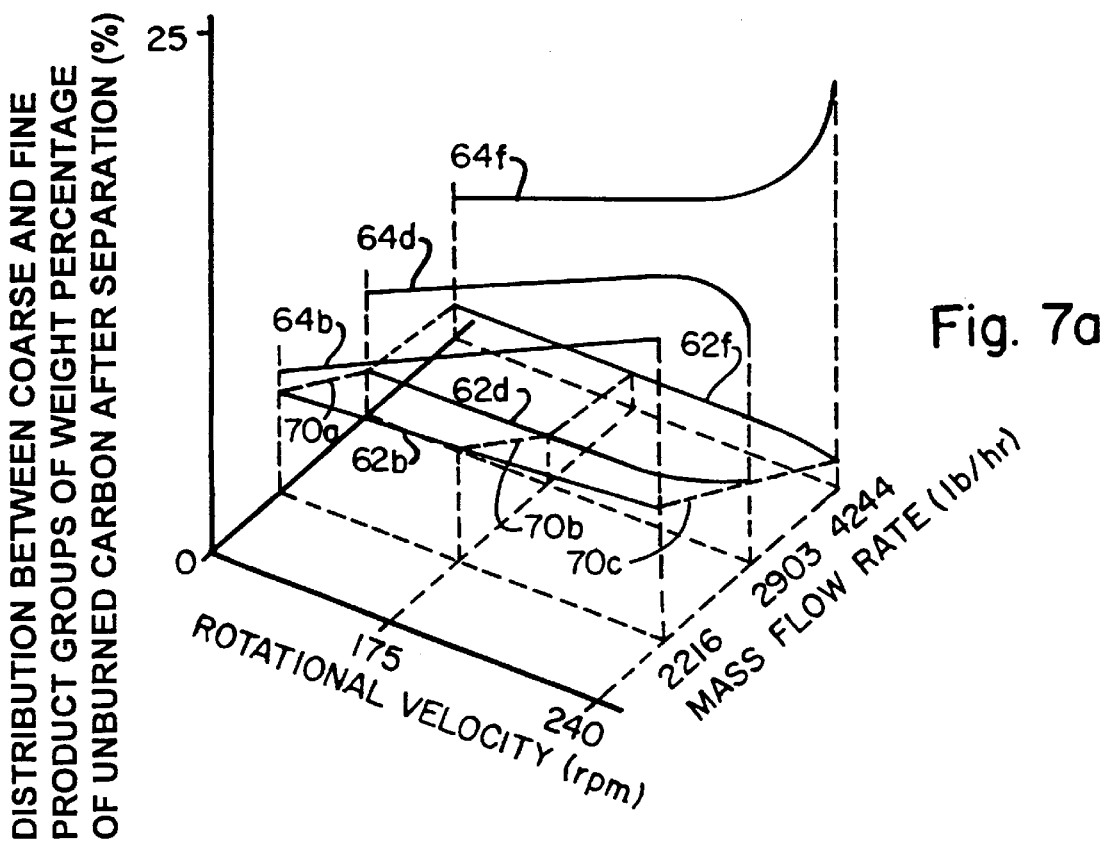
FIG. 7a is a graphical presentation, in three dimensions, of the distribution between the coarse product group and the fine product group of the weight percentage of unburned Carbon in the respective product groups after separation, as a function of rotational velocity at the first, second and third mass flow rates.

Reference is now had to FIG. 6 and FIG. 6a. FIG. 6 and FIG. 6a are graphical presentation that should also be viewed together. FIG. 6 again displays the distribution in percentage between the coarse product group 62 and the fine product group 64 of the total mass of flyash recovered after separation, as a function of the rotational velocity of the rotary classifier 52. FIG. 6a displays the distribution between the coarse product group 62 and the fine product group 64 of the weight percentage of unburned Carbon after separation, as a function of rotational velocity. It should be understood from FIG. 6 and FIG. 6a that these graphs 62e, 62f, 64e, 64f are based upon a third mass flow rate of the flyash-entrained fluid stream 34 of about 4244 lbs. of flyash per hour.

In comparing FIG. 6 and FIG. 6a it is noteworthy, as in FIGS. 4 and 4a and FIGS. 5 and 5a, that the weight percentage of unburned Carbon is lowest in the coarse product group 62 as seen in the graph designated by the reference numeral 62f in FIG. 6a, while yet the coarse product group 62 comprises the highest percentage of total mass of flyash recovered after separation as seen in the graph designated by the reference numeral 62e in FIG. 6. In contrast, it is again noteworthy that the weight percentage of unburned Carbon is highest in the fine product group 64 as seen in the graph designated by the reference numeral 64f in FIG. 6a, while yet the fine product group 64 comprises the lowest percentage of total mass of flyash recovered after separation as seen in the graph designated by the reference numeral 64e in FIG. 6. As seen in FIG. 6a, the weight percentage of unburned Carbon in the coarse product group 62f begins with a value of approximately 3% at a rotational velocity of zero and rises slowly to a value of about 5% at a rotational velocity of approximately 240 rpm. Also seen in FIG. 6a, the weight percentage of unburned Carbon in the fine product group 64f begins with a value of approximately 13% at a rotational velocity of zero and increases approximately linearly to a value of approximately 15% at a rotational velocity of approximately 150 rpm and thence increases in an approximately quadratic fashion to a value of about 23% at a rotational velocity of about 240 rpm. In FIG. 6 the percentage of the total mass of flyash recovered in the coarse product group 62e begins with a value of approximately 54% at a rotational velocity of zero and increases approximately linearly to a value of approximately 84% at a rotational velocity of approximately 240 rpm. Furthermore in FIG. 6, the percentage of the total mass of flyash recovered in the fine product group 64e begins with a value of approximately 46% at a rotational velocity of zero and decreases approximately linearly to a value of approximately 16% at a rotational velocity of approximately 240 rpm.

Figure 8:
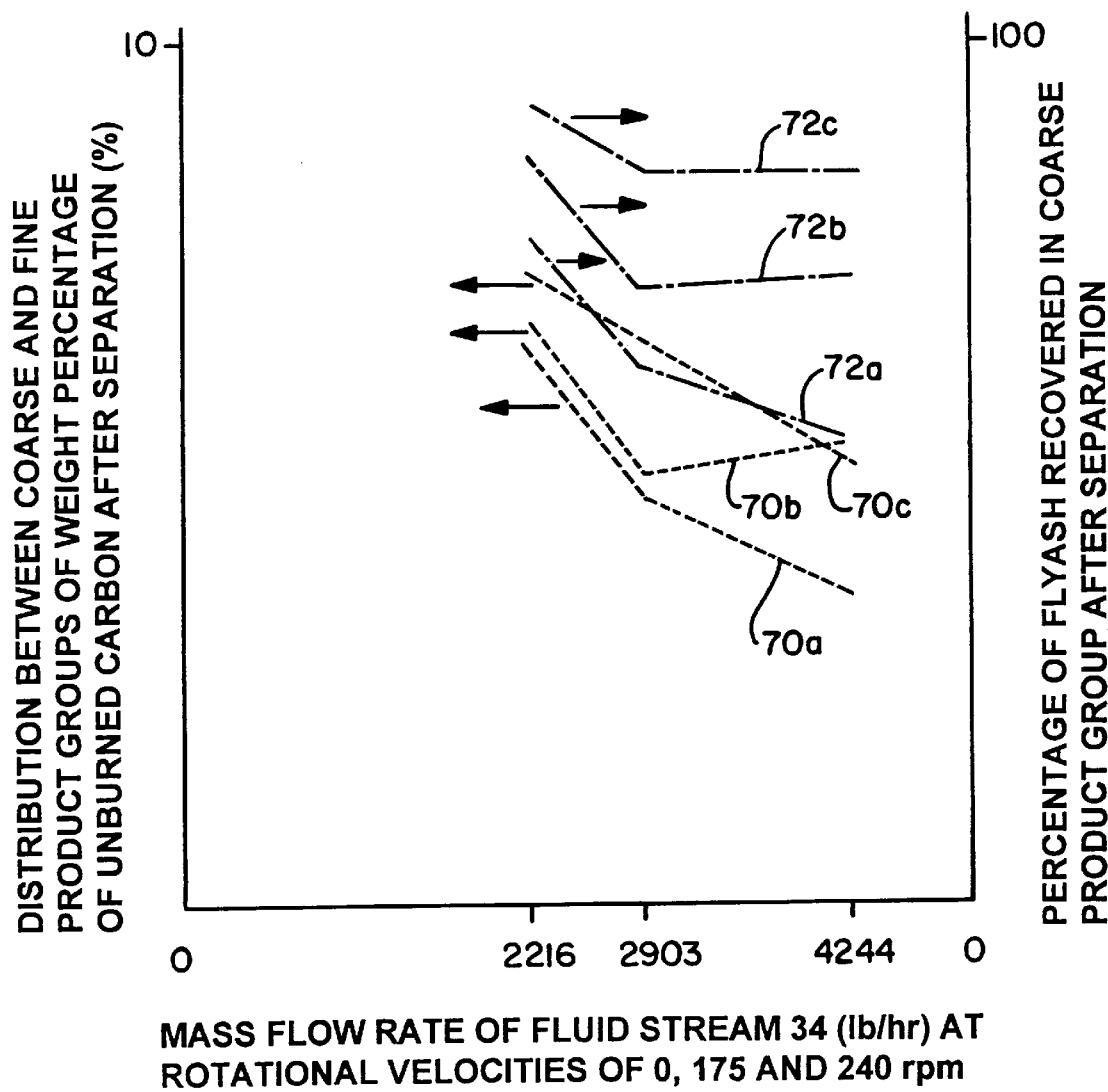
FIG. 8 is a graphical presentation, at specific rotational velocities, of the weight percentage of unburned Carbon indigenous to the coarse product group after separation and the percentage of the total mass of flyash recovered in the coarse product group after separation, both as a function of mass flow rate.

However, a further comparison should be made of FIGS. 4 and 4a, FIGS. 5 and 5a and FIGS. 6 and 6a. In particular, it is noteworthy that, at high rotational velocities, the disparity that has been noted with respect to the distribution between the coarse product group 62 and fine product group 64 of the weight percentage of unburned Carbon after separation compared with the distribution between the coarse product group 62 and fine product group 64, of the percentage of total mass of flyash recovered after separation becomes evermore prominent for the third or highest mass flow rate, as seen in FIGS. 6 and 6a. In other words, at high rotational velocities and at high mass flow rates, the coarse product group 62 possesses relatively little weight percentage of unburned Carbon after separation, while yet the coarse product group 62 is clearly the greater amount recovered after separation; and concomitantly the fine product group 64 possesses relatively greater weight percentage of unburned Carbon while yet the fine product group 64 is the lesser amount recovered after separation. This fact is made dramatically clear in FIG. 8. FIG. 8 is a graphical display of two sets of functional relationships. The first set of functional relationships depicted therein, as designated by the reference numerals 70a, 70b and 70c, are representative of the weight percentages of unburned Carbon indigenous to the coarse product group 62 recovered after separation as a function of the mass flow rate of the flyash-entrained fluid stream 34, at rotational velocities of zero and approximately 175 rpm and 240 rpm, respectively. The second set of functional relationships depicted therein, as designated by the reference numerals 72a, 72b and 72c are the percentages of flyash recovered in the coarse product group 62 after separation, also as a function of the mass flow rate of the flyash-entrained fluid stream 34 at rotational velocities of zero and approximately 175 rpm and 240 rpm respectively. As can be seen in FIG. 8, at reference numeral 70c, at the relatively high rotational velocity of about 240 rpm, the weight percentage of unburned Carbon indigenous to the coarse product group 62 after separation decays approximately linearly from a value of approximately 7% at a mass flow rate of about 2216 lbs. of flyash per hour to a value of about 5% at a mass flow rate of about 4244 lbs. of flyash per hour. More particularly, the aforesaid linear decay is approximated by the equation $$y = mx + b$$

wherein m is approximately equal to $-1.07 \times 10^{-3}$ and b is approximately equal to 9.5. The aforesaid linear decay is operative while yet, at reference numeral 72c, although the percentage of flyash recovered in the coarse product group after separation initially also decays approximately linearly from a value of about 93% at a mass flow rate of 2216 lbs. of flyash per hour to a value of about 85% at a mass flow rate of 2903 lbs. of flyash per hour, the percentage of flyash recovered in the coarse product group after separation remains constant at a value of about 85% from a mass flow rate of about 2903 lbs. of flyash per hour to a mass flow rate of about 4244 lbs. of flyash per hour. In comparison, it is instructive to refer, in FIG. 8, to reference numerals 70b and 72b representative of the weight percentage of unburned Carbon and the percentage of flyash recovered in the coarse product group at a rotational velocity of approximately 175 rpm, and similarly for reference numerals 70a and 72a, at zero rotational velocity. As can be seen, at either zero rotational velocity or at approximately 175 rpm, there is no mass flow rate of the flyash-entrained fluid stream 34 that, in combination therewith, yields the relatively high recovery rate coupled with the relatively low weight percentage of unburned Carbon that is seen, as described above, with the combination of high mass flow rate and high rotational velocity.

It should therefore be obvious from the foregoing analysis of FIGS. 4 and 4a, FIGS. 5 and 5a, FIGS. 6 and 6a and FIG. 8 that, through the judicious manipulation and control of the mass flow rate of the flyash-entrained fluid stream 34 and the rotational velocity of the rotary classifier 52, a definite trend is seen whereby a weight percentage of unburned Carbon of 5%, in at least one of the aforesaid product groups 62, 64, is approached and met in an efficient manner, i.e., a relatively low weight percentage of unburned Carbon is acquired coupled with a relatively high recovery rate.

While the foregoing description of the preferred embodiment of the present invention incorporated the use of a collection means 26 strategically disposed along the fluid flow path of the flyash-laden flue-gas stream 18, 30 as a means for collecting the flyash before the injection thereof into the separator 40, it should be understood that with respect to the preferred embodiment of the present invention such a step of collecting the flyash 30 in a collection means 26 may be forgone and the flyash-laden flue-gas stream 18, 30 injected directly into the separator 40 to accomplish the method of the present invention without disturbing the experimental results.

It can be seen, therefore, that through the use of the present invention, one is able to achieve a relatively low weight percentage of unburned Carbon after separation in at least one of the two product groups 62, 64 while yet collecting a relatively high percentage of the total mass of flyash recovered after separation.

Thus, in accordance with the method of the present invention, there has been provided a new and improved method of separating particulate matter based upon differences in specific gravity.

Also in accordance with the method of the present invention, there has been provided a new and improved method of separating particulate matter based upon differences in the velocity of particles in a fluid stream.

In particular, in accordance with the method of the present invention, there has been provided a new and improved method of separating unburned Carbon particles from the collected flyash produced as a result of the combustion process occurring in a pulverized-coal fired steam generating power plant.

Yet further, in accordance with the method of the present invention, there has been provided such a new and improved method of separating the unburned Carbon particles from the collected flyash produced as a result of the combustion process occurring in a pulverized-coal fired steam generating power plant such that through the use thereof there are derived two product groups.

Still further, in accordance with the method of the present invention, there has been provided such a new and improved method of separating the unburned Carbon particles from the flyash produced as a result of the combustion process occurring in a pulverized-coal fired steam generating power plant such that through the use thereof at least one of the product groups contains a relatively small weight percentage of unburned Carbon while yet comprising a relatively high percentage of the total mass of flyash recovered after separation.

While one embodiment of our invention has been shown, it will be appreciated by those skilled in the art that modifications may readily be made thereto. We, therefore, intend by the appended claims to cover any modifications alluded to herein as well as to all modifications that fall within the true spirit and scope of our invention.

What is claimed is:

1. In a pulverized-coal fired steam generating power plant having a furnace volume for the combustion of pulverized-coal therein generating thereby a flue-gas stream laden with flyash, a backpass volume, a horizontal pass for conducting the flyash-laden flue-gas stream from the furnace volume to the backpass volume thence therethrough, a stack, means for conducting the flyash-laden flue-gas stream from the backpass volume to the stack thence therethrough to the atmosphere, a method of separating unburned carbon as particulate matter from the flyash, said method comprising the steps of:

a. effecting a separation of the flyash-laden flue-gas stream as a function of a difference in a property between a gas component of the flue-gas stream and a particle component thereof such that the gas component is more apt to flow along a first fluid flow path and the particle component is more apt to flow along a second fluid flow path, the portion of the flue-gas stream flowing along said second fluid flow path having entrained therein a quantity of flyash containing a first fraction of particles including at least unburned carbon particles and a second fraction of other particulate matter, said particles of the first fraction having a relatively higher specific gravity than the particles of the second fraction;

b. as a function of the difference in the specific gravities of the first and second fractions in said quantity of flyash effecting a separation of said quantity of flyash into a first product group and an interim product group such that the ratio of the number of second fraction particles having relatively lower specific gravities in the interim product group to the number of second fraction particles having relatively lower specific gravities in the at least one of said first or second fractions is greater than the ratio of the number of first fraction particles having relatively higher specific gravities in the interim product group to the number of first fraction particles having relatively higher specific gravities in the at least one of said first or second fractions; and c. effecting a separation of the interim product group.

2. The method of separating unburned carbon as particulate matter from the flyash as set forth in claim 1 wherein the step of effecting a second separation of the flyash-laden flue-gas stream into a first product group and a second product group includes the step of providing a separator disposed along at least one of said first or second fluid flow paths operative to effect thereby the second separation.

3. The method of separating unburned carbon as particulate matter from the flyash as set forth in claim 2 wherein the step of providing a separator includes the step of providing a housing having fluid inlet means, first fluid exit means, second fluid exit means and an axis central thereto.

4. The method of separating unburned carbon as particulate matter from the flyash as set forth in claim 3 wherein the step of providing a separator includes the step of providing first separation means and second separation means disposed within the separator.

5. The method of separating unburned carbon as particulate matter from the flyash as set forth in claim 4 wherein the step of providing first separation means and second separation means includes the step of providing an inverted, truncated collector cone coaxial with the axis and disposed within the housing at the lower segment thereof above the fluid inlet means in fluid communication therewith and so as to form thereby an annular opening between the periphery of the collector cone and the housing, rotary classifier means coaxial with the axis and disposed within the housing at the upper segment thereof in fluid communication with the second fluid exit means, an expansion chamber defined by the housing and disposed therein above said collector cone and below said rotary classifier;

said annular opening having a first cross sectional area and said expansion chamber having a second cross sectional area greater than the first cross sectional area.

6. The method of separating unburned carbon as particulate matter from the flyash as set forth in claim 5 wherein the step of effecting a second separation of the flyash-laden flue-gas stream into a first product group and a second product group includes the step of providing means disposed along at least one of said first or second fluid flow paths for collecting the flyash.

7. The method of separating unburned carbon as particulate matter from the flyash as set forth in claim 6 wherein the step of providing means disposed along at least one of said first or second fluid flow paths for collecting the flyash includes the step of collecting the flyash at said flyash collecting means.

8. The method of separating unburned carbon as particulate matter from the flyash as set forth in claim 7 wherein the step of collecting the flyash includes the step of entraining the collected flyash in a fluid stream.

9. The method of separating unburned carbon as particulate matter from the flyash as set forth in claim 8 wherein the step of entraining the collected flyash in the fluid stream includes the step of injecting the flyash-entrained fluid stream into the separator at the fluid inlet means.

10. The method of separating unburned carbon as particulate matter from the flyash as set forth in claim 9 wherein the step of injecting the flyash-entrained fluid stream into the separator at the fluid inlet means includes the step of directing the flyash-entrained fluid stream through the separator whereby the flyash-entrained fluid stream flows through the housing from the fluid inlet means around the collector cone and through the annular opening into the expansion chamber wherein relatively heavy unburned carbon particles and other relatively heavy flyash fall out of the flyash-entrained fluid stream into the collector cone to form a second product group discharged from the separator at the first fluid exit means, thence while yet still containing those unburned carbon particles and other flyash not so heavy as to fall out of the flyash-entrained fluid stream upward from the expansion chamber to the rotary classifier means whereat those unburned carbon particles and other flyash possessing sufficient velocity pass through the rotary classifier means to form a first product group discharged from the separator at the second fluid exit means and whereat those unburned carbon particles and other flyash not possessing sufficient velocity fall into the collector cone to join the second product group discharged from the separator at the first fluid exit means.

11. The method of separating unburned carbon as particulate matter from the flyash as set forth in claim 10 wherein the step of directing the flyash-entrained fluid stream through the separator includes the step of effecting control over the mass flow rate of the flyash-entrained fluid stream over a continuous range of mass flow rates.

12. The method of separating unburned carbon as particulate matter from the flyash as set forth in claim 11 wherein the step of directing the flyash-entrained fluid stream through the separator includes the step of effecting control over the rotational velocity of the rotary classifier means over a continuous range of rotational velocities.

13. The method of separating unburned carbon as particulate matter from the flyash as set forth in claim 12 wherein the step of effecting a second separation of the flyash-entrained flue-gas stream into a first product group and a second product group includes the step of simultaneously establishing a first mass flow rate of the flyash-entrained fluid stream and a first rotational velocity of the rotary classifier means.

14. The method of separating unburned carbon as particulate matter from the flyash as set forth in claim 13 wherein the step of simultaneously establishing a first mass flow rate of the flyash-entrained fluid stream and a first rotational velocity of the rotary classifier means includes the step of establishing a first mass flow rate and a first rotational velocity such that the distribution between the coarse product group and the fine product group of the weight percentage of unburned carbon after the second separation as a function of the mass flow rate of the flyash-entrained fluid stream is characterized by an approximately linear functional relationship according to the equation $$y=mx+b$$

wherein m is approximately equal to $-1.07 \times 10^{-3}$ and b is approximately equal to 9.5.

15. The method of separating unburned carbon as particulate matter from the flyash as set forth in claim 5 wherein the step of effecting a second separation of the flyash-laden flue-gas stream into a first product group and a second product group includes the step of injecting the flyash-laden flue-gas stream of at least one of the first or second fluid flow paths into the separator at the fluid inlet means.

16. The method of separating unburned carbon as particulate matter from the flyash as set forth in claim 15 wherein the step of injecting the flyash-laden flue-gas stream of at least one of the first or second fluid flow paths into the separator at the fluid inlet means includes the step of directing the flyash-laden flue-gas stream of at least one of the first or second fluid flow paths through the separator whereby the flyash-laden flue-gas stream of at least one of the first or second fluid flow paths flows through the housing from the fluid inlet means around the collector cone and through the annular opening into the expansion chamber wherein relatively heavy unburned carbon particles and other relatively heavy flyash fall out of the flyash-laden flue-gas stream of at least one of the first or second fluid flow paths into the collector cone to form a second product group discharged from the separator at the first fluid exit means, thence while yet still containing those unburned carbon particles and other flyash not so heavy as to fall out of the flyash-laden flue-gas stream of at least one of the first or second fluid flow paths upward from the expansion chamber to the rotary classifier means whereat those unburned carbon particles and other flyash possessing sufficient velocity pass through the rotary classifier means to form a first product group discharged from the separator at the second fluid exit means and whereat those unburned carbon particles and other flyash not possessing sufficient velocity fall into the collector cone to join the second product group discharged from the separator at the first fluid exit means.

17. The method of separating unburned carbon as particulate matter from the flyash as set forth in claim 16 wherein the step of directing the flyash-laden flue-gas stream of at least one of the first or second fluid flow paths through the separator includes the step of effecting control over the mass flow rate of the flyash-laden flue-gas stream of at least one of the first or second fluid flow paths over a continuous range of mass flow rates.

18. The method of separating unburned carbon as particulate matter from the flyash as set forth in claim 17 wherein the step of directing the flyash-laden flue-gas stream of at least one of the first or second fluid flow paths through the separator includes the step of effecting control over the rotational velocity of the rotary classifier means over a continuous range of rotational velocities.

19. The method of separating unburned carbon as particulate matter from the flyash as set forth in claim 18 wherein the step of simultaneously establishing a first mass flow rate of the flyash-laden flue-gas stream of at least one of the first or second fluid flow paths and a first rotational velocity of the rotary classifier means includes the step of establishing a first mass flow rate and a first rotational velocity such that the distribution between the second product group and the first product group of the weight percentage of unburned carbon after the second separation as a function of the mass flow rate of the flyash-laden flue-gas stream of at least one of the first or second fluid flow paths is characterized by an approximately linear functional relationship according to the equation $$y=mx+b$$

wherein m is approximately equal to $-1.07 \times 10^{-3}$ and b is approximately equal to 9.5.

20. In a pulverized-coal fired steam generating power plant having a furnace volume for the combustion of pulverized-coal therein generating thereby a flue-gas stream laden with flyash, a backpass volume, a horizontal pass for conducting the flyash-laden flue-gas stream from the furnace volume to the backpass volume thence therethrough, a stack, means for conducting the flyash-laden flue-gas stream from the backpass volume to the stack thence therethrough to the atmosphere, a system for separating the unburned carbon as particulate matter from the flyash, said system comprising:

a. means for effecting a separation of the flyash-laden flue-gas stream as a function of a difference in a property between a gas component of the flue-gas stream and a particle component thereof such that the gas component is more apt to flow along a first fluid flow path and the particle component is more apt to flow along a second fluid flow path, the portion of the flue-gas stream flowing along said second fluid flow path having entrained therein a quantity of flyash containing a first fraction of particles including at least unburned carbon particles and a second fraction of other particulate matter, said particles of the first fraction having a relatively higher specific gravity than the particles of the second fraction;

b. means for effecting a separation of said quantity of flyash into a first product group and an interim product group as a function of the difference in the specific gravities of the first and second fractions in said quantity of flyash such that the ratio of the number of second fraction particles having relatively lower specific gravities in the interim product group to the number of second fraction particles having relatively lower specific gravities in the at least one of said first or second fractions is greater than the ratio of the number of first fraction particles having relatively higher specific gravities in the interim product group to the number of first fraction particles having relatively higher specific gravities in the at least one of said first or second fractions; and c. means for effecting a separation of the interim product group.

* * * * *